(12) United States Patent
Yonetsu

(10) Patent No.: US 11,167,601 B2
(45) Date of Patent: Nov. 9, 2021

(54) PNEUMATIC TIRE AND PNEUMATIC TIRE MOLDING

(71) Applicant: TOYO TIRE & RUBBER CO., LTD., Itami (JP)

(72) Inventor: Isao Yonetsu, Itami (JP)

(73) Assignee: TOYO TIRE CORPORATION, Itami (JP)

(*) Notice: Subject to any disclaimer, the term of this patent is extended or adjusted under 35 U.S.C. 154(b) by 153 days.

(21) Appl. No.: 16/207,762

(22) Filed: Dec. 3, 2018

(65) Prior Publication Data

US 2019/0193481 A1    Jun. 27, 2019

(30) Foreign Application Priority Data

Dec. 22, 2017 (JP) ............................. JP2017-246907

(51) Int. Cl.
| | | |
|---|---|---|
| *B60C 13/02* | (2006.01) | |
| *B29D 30/72* | (2006.01) | |
| *B60C 13/00* | (2006.01) | |
| *B29D 30/06* | (2006.01) | |

(52) U.S. Cl.
CPC ........ *B60C 13/001* (2013.01); *B29D 30/0606* (2013.01); *B29D 30/72* (2013.01); *B60C 13/02* (2013.01); *B29D 2030/0612* (2013.01)

(58) Field of Classification Search
CPC .................. B60C 13/001; B60C 13/02; B29D 2030/0612
See application file for complete search history.

(56) References Cited

U.S. PATENT DOCUMENTS

| | | | | |
|---|---|---|---|---|
| 5,263,525 A | * | 11/1993 | Yamashita | .............. B60C 13/04 |
| | | | | 152/523 |
| 2002/0074071 A1 | | 6/2002 | Oyama | |
| 2010/0051159 A1 | * | 3/2010 | Fujioka | ................. B60C 13/001 |
| | | | | 152/523 |

(Continued)

FOREIGN PATENT DOCUMENTS

| | | | | |
|---|---|---|---|---|
| EP | 0391833 A1 | | 10/1990 | |
| EP | 1106396 A2 | | 6/2001 | |
| EP | 2711202 A1 | * | 3/2014 | ........... B60C 13/001 |

(Continued)

OTHER PUBLICATIONS

Machine Translation: JP-10086615-A, Itabashi, Shinobu, (Year: 2021).*

(Continued)

*Primary Examiner* — Kendra Ly
(74) *Attorney, Agent, or Firm* — Westerman, Hattori, Daniels & Adrian, LLP

(57) ABSTRACT

A pneumatic tire includes a carcass layer that has a toroidal shape and extends between a pair of bead portions, a sidewall portion, one of the pair of bead portions being provided at an inner end of the sidewall portion in a tire radial direction TR, and a mark formed in an outer surface of the sidewall portion. The mark includes a protruded portion provided in the outer surface of the sidewall portion and recessed inward in a tire width direction, and a mark body defined by the protruded portion. The surface of the mark body coincides with a reference surface corresponding to the outer surface of the sidewall portion.

10 Claims, 6 Drawing Sheets

(56) References Cited

U.S. PATENT DOCUMENTS

2013/0263993 A1* 10/2013 Niwa .................... B60C 13/002
152/523

FOREIGN PATENT DOCUMENTS

| | | | |
|---|---|---|---|
| JP | H10-67208 A | | 3/1998 |
| JP | H10-76815 A | | 3/1998 |
| JP | 10086615 A | * | 4/1998 |
| JP | 2008-265502 A | | 11/2008 |
| JP | 4449203 B2 | | 4/2010 |
| JP | 2010100090 A | * | 5/2010 |
| JP | 2014-73647 A | | 4/2014 |

OTHER PUBLICATIONS

Machine Translation: EP-2711202-A1, Rittweger Stefan (Year: 2021).*
Machine Translation: JP-2010100090-A, Watanabe, Suketaka, (Year: 2021).*
Office Action dated Sep. 1, 2020, issued in counterpart CN Application No. 201811488583.1, with English translation (11 pages).
Office Action dated Apr. 16, 2021, issued in counterpart CN application No. 201811488583.1, with the English translation. (13 pages).
Office Action dated Sep. 7, 2021, issued in counterpart JP application No. 2017-246907, with English machine translation. (16 pages).

* cited by examiner

PNEUMATIC TIRE AND PNEUMATIC TIRE MOLDING

CROSS-REFERENCE TO RELATED APPLICATIONS

This application claims priority of Japanese Patent Application No. 2017-246907 filed on Dec. 22, 2017, the content of which is incorporated herein by reference.

BACKGROUND OF THE INVENTION

Technical Field

The present invention relates to a pneumatic tire and a pneumatic tire molding die.

Related Art

A pneumatic tire disclosed in Japanese Patent No. 4449203 includes a recessed mark, and a protruded portion adjacent to the recessed mark, both formed in a surface of a sidewall portion, and specifies a volume ratio of the recessed mark to the protruded portion. According to this pneumatic tire, rubber of the recessed portion is shifted to the protruded portion during tire vulcanization molding to avoid a thickness change of the sidewall portion at a mark position and thereby prevent bending of a carcass layer at the mark position.

However, the pneumatic tire disclosed in Japanese Patent No. 4449203 still has room for improvement concerning local bending of the carcass layer.

SUMMARY

An object of the present invention is to provide a pneumatic tire which includes a sidewall portion provided with marks, and is capable of reducing local bending of a carcass layer.

An aspect of the present invention provides a pneumatic tire comprising: a carcass layer that has a toroidal shape and extends between a pair of bead portions; a sidewall portion, one of the pair of bead portions being provided at an inner end of the sidewall portion in a tire radial direction; and a mark formed in an outer surface of the sidewall portion. The mark includes a protruded portion provided in the outer surface of the sidewall portion and protruded outward in a tire width direction, and a mark body defined by the protruded portion. A surface of the mark body coincides with a reference surface corresponding to the outer surface of the sidewall portion.

In the above aspect, the phrase "to coincide" is not limited to perfect coincidence, and may indicate coincidence in a range including an error unavoidable in manufacturing.

According to the foregoing configuration, the mark is constituted by the protruded portion protruded from the outer surface of the sidewall portion, and the mark body defined by the protruded portion. Accordingly, local bending of the carcass layer can be more reduced compared with the configuration in which the mark body is constituted by a protruded portion.

The protruded portion may include a first surface continuous with the surface of the mark body, and a second surface continuous with the outer surface of the sidewall portion.

The protruded portion may include a third surface that connects the first surface and the second surface.

The first surface may be linear in a cross section orthogonal to a direction in which the protruded portion extends. An angle formed by the first surface and a normal direction of the reference surface in the cross section orthogonal to the direction in which the protruded portion may extend lies in a range from 5° inclusive to 30° inclusive.

According to this configuration, the angle formed by the first surface of the protruded portion and the normal direction of the reference surface in the cross section orthogonal to the direction in which the protruded portion extends is specified within the appropriate range. Accordingly, visibility of the mark can be secured. When the angle formed by the first surface of the protruded portion and the tire radial direction is larger than the above range, the boundary between the mark body and the protruded portion becomes unclear. In this case, sufficient visibility of the mark cannot be secured. When the angle formed by the first surface of the protruded portion and the normal direction of the reference surface is smaller than the above range, the area of the first surface visible from the outside in the normal direction decreases. In this case, sufficient visibility of the mark cannot be secured.

A representative length of the protruded portion in a direction orthogonal to a normal direction of the reference surface in a cross section orthogonal to a direction in which the protruded portion extends may lie in a range from 2.5 times inclusive to 5 times inclusive a maximum dimension of the protruded portion in the normal direction of the reference surface. The representative length of the protruded portion may be a dimension in the direction orthogonal to the normal direction of the reference surface between a vertex of the protruded portion and a connecting portion where the protruded portion is connected to the sidewall portion.

According to this configuration, the maximum dimension of the protruded portion in the direction orthogonal to the normal direction is specified in the appropriate range described above (2.5 times inclusive to 5 times inclusive maximum dimension of recessed portion in normal direction) in the cross section orthogonal to the direction in which the protruded portion extends. In this case, local bending of the carcass layer can be reduced while securing visibility of the mark. When the maximum dimension of the protruded portion in the direction orthogonal to the normal direction is larger than the above range, the dimension of the protruded portion in the direction orthogonal to the normal direction becomes excessively larger. In this case, an area of the protruded portion affecting the shape of the carcass layer increases. When the maximum dimension of the protruded portion in the direction orthogonal to the normal direction is smaller than the above range, a visible area of the protruded portion decreases. In this case, sufficient visibility cannot be secured.

Another aspect of the present invention provides a pneumatic tire molding die, in which a recessed portion corresponding to the protruded portion is formed in a molding surface and a vent hole is formed in the recessed portion.

According to this configuration, the vent hole is provided in the recessed portion where air easily stays during vulcanization molding of the pneumatic tire. Accordingly, reduction of molding failure of the pneumatic tire is achievable.

The vent hole may be formed in a portion of the recessed portion, the portion corresponding to the second surface of the protruded portion.

According to this configuration, the vent hole is provided in the portion of the recessed portion corresponding to the second surface of the protruded portion. Accordingly, effective reduction of molding failure of the pneumatic tire is achievable.

According to the present invention, the mark is constituted by the protruded portion protruded from the outer surface of the sidewall portion, and the mark body defined by the protruded portion. Accordingly, local bending of the carcass layer can be more reduced compared with the configuration in which the mark body is constituted by a protruded portion.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Embodiments of the present invention will be hereinafter described with reference to the accompanying drawings. In the accompanying drawings referred to below, a tire radial direction and a tire width direction are given reference signs TR and TW, respectively.

First Embodiment

[Pneumatic Tire]

Figure 1:
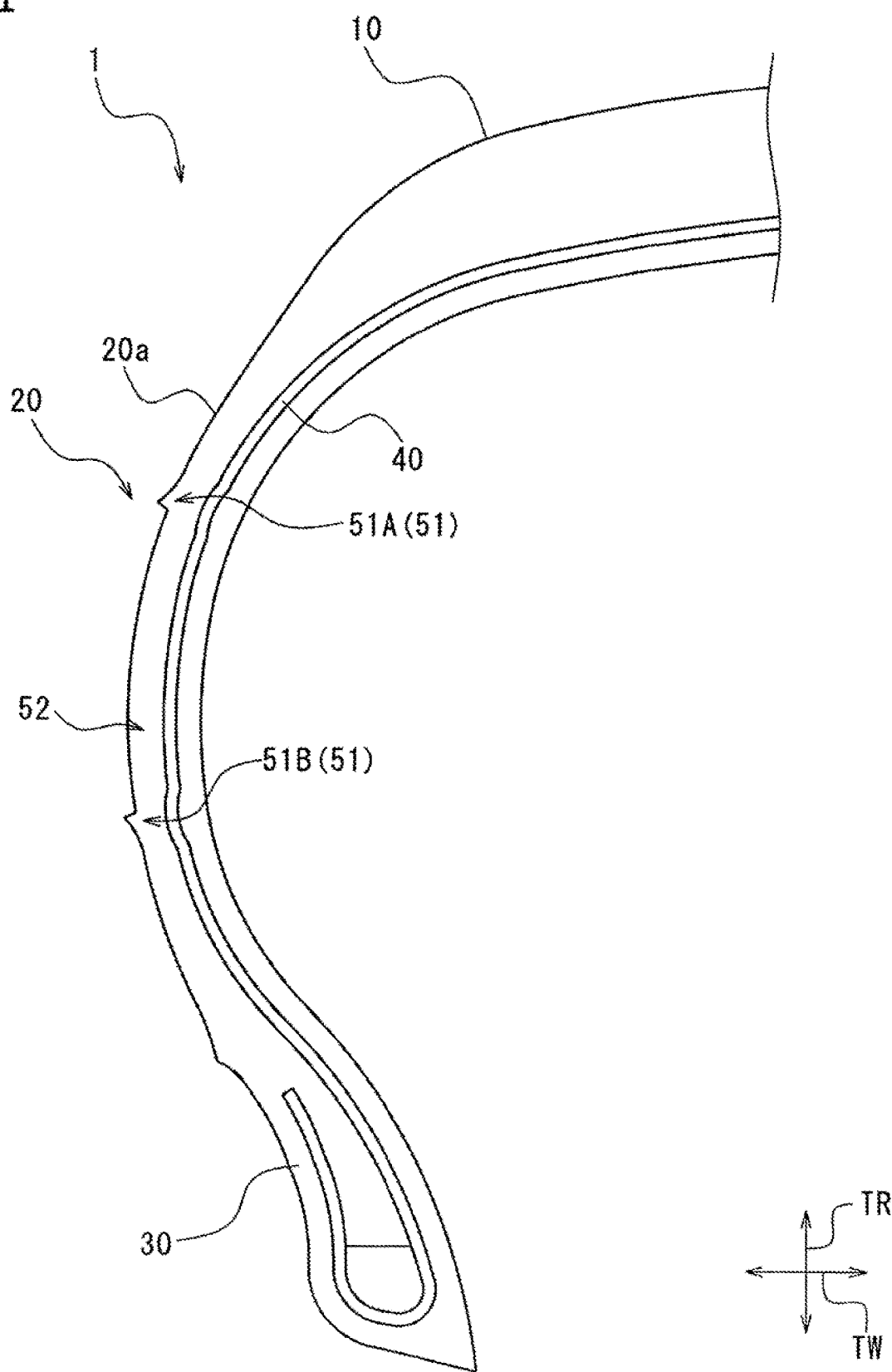
FIG. 1 is a cross-sectional view of a pneumatic tire in a meridian direction according to a first embodiment of the present invention.

Referring to FIG. 1, a pneumatic tire 1 includes a tread portion 10, a sidewall portion 20, and a pair of bead portions 30. The sidewall portions 20 extend from both end portions of the tread portions 10 in the tire width direction TW while curving toward the inside in the tire radial direction TR. Each of the bead portions 30 is provided at an inner end of the corresponding sidewall portion 20 in the tire radial direction TR. A carcass layer 40 having a toroidal shape is extended between the pair of bead portions 30 inside the pneumatic tire 1. The accompanying drawing does not show internal structures except for the carcass layer 40.

Figure 2:
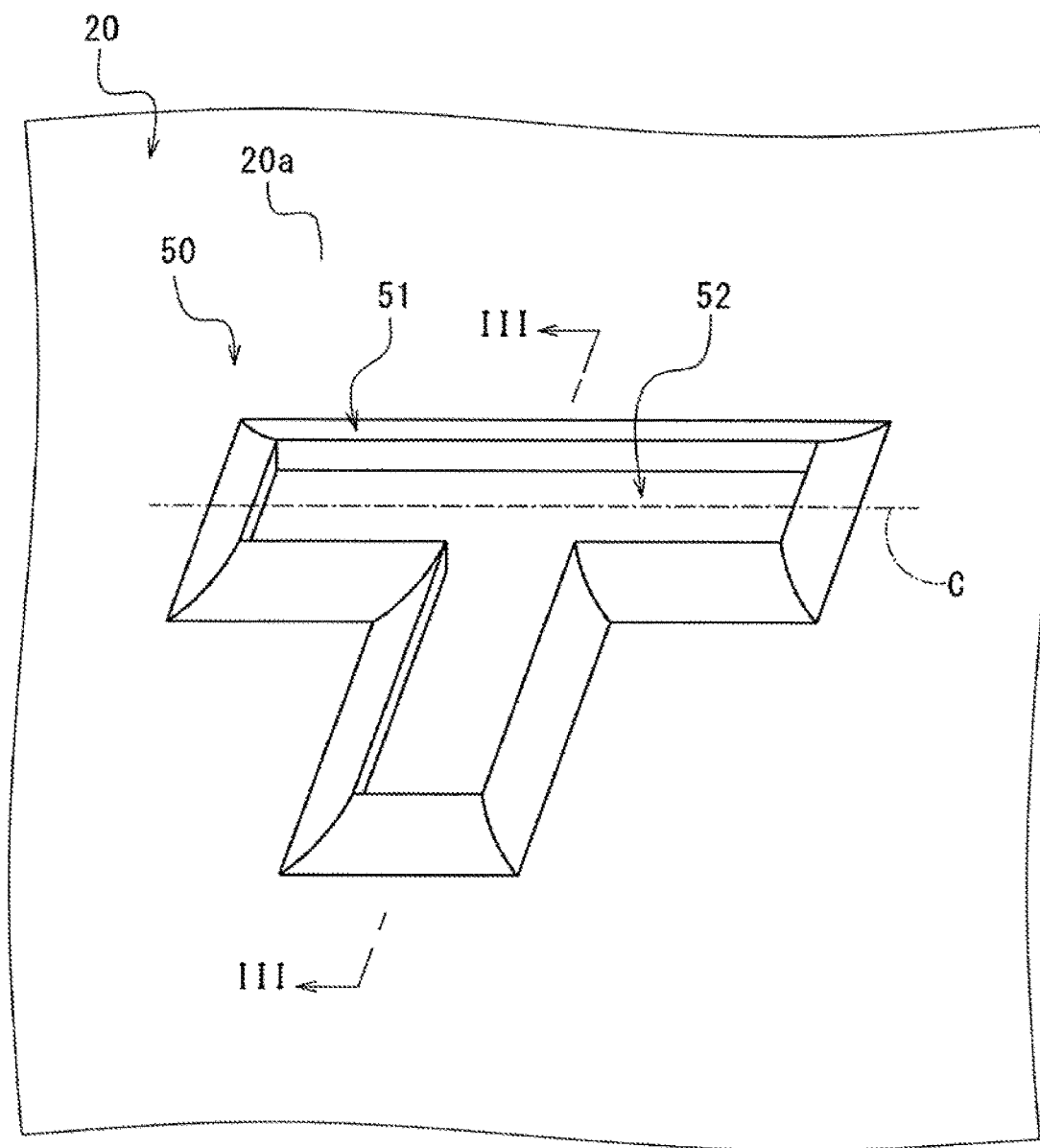
FIG. 2 is a perspective view of a mark according to the first embodiment as viewed from an outside in a tire width direction.

The sidewall portion 20 of the present embodiment has an outer surface 20a having an arcuate shape in a tire meridian cross section. Referring to FIG. 2 in conjunction with the foregoing figure, a mark 50 is formed in the outer surface 20a of the sidewall portion 20. According to the present embodiment, the mark 50 has a shape similar to an alphabetic capital letter "T" as shown in FIG. 2. The mark 50 includes a protruded portion 51 so formed as to protrude outward from the outer surface 20a of the sidewall portion 20 in the tire width direction TW, and a mark body 52 defined by the protruded portion 51.

Figure 3:
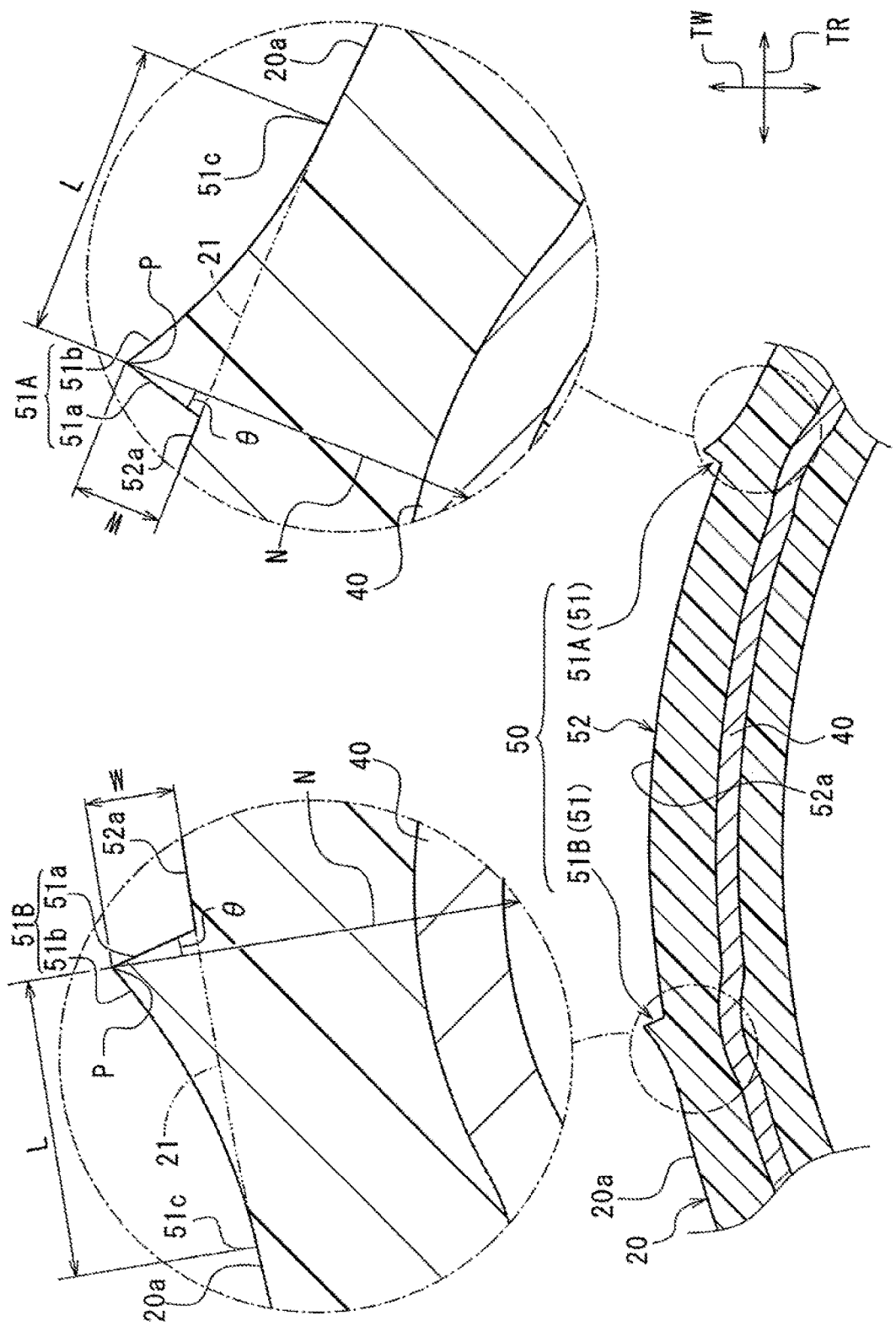
FIG. 3 is a cross-sectional view of a main part taken along a line III-III of FIG. 2.

The protruded portion 51 of the present embodiment is so formed as to line an edge of the letter "T". The mark body 52 is therefore so defined as to represent the letter "T". For example, in the cross section shown in FIG. 3, the protruded portion 51 has protrusions 51A and 51B provided at two different positions of the sidewall portion 20 in the tire radial direction TR. This cross section is a cross section orthogonal to directions in which the protrusions 51A and 51B extend, particularly a tire meridian cross section according to the present embodiment. Each of the protrusions 51A and 51B of the present embodiment includes a first surface 51a continuous with a surface 52a of the mark body 52, and a second surface 51b continuous with the outer surface 20a of the sidewall portion 20. The first surface 51a and the second surface 51b of the present embodiment are continuously formed. Each of the first surfaces 51a of the protrusions 51A and 51B of the present embodiment is linear extending in the tire width direction TW in the tire meridian cross section. An angle θ formed by each of the first surfaces 51a of the protrusions 51A and 51B and a normal direction N of a reference surface 21 passing through a vertex P in the tire meridian cross section is set within a range from 5° inclusive to 30° inclusive. The vertex P of the present embodiment is a boundary point between the first surface 51a and the second surface 51b of each of the protrusions 51A and 51B. The second surface 51b of each of the protrusions 51A and 51B of the present embodiment is arcuate in the tire meridian cross section.

A representative length L of each of the protrusions 51A and 51B in a direction orthogonal to the normal direction N in the tire meridian cross section is set within a range from 2.5 times inclusive to 5 times inclusive a maximum dimension W of each of the protrusions 51A and 51B in the normal direction N. The representative length L of each of the protrusions 51A and 51B is a dimension between the vertex P of each of the protrusions 51A and 51B and a connecting portion 51c for connecting the protrusions 51A and 51B to the outer surface 20a of the sidewall portion 20 in the direction orthogonal to the normal direction N.

The surface 52a of the mark body 52 of the present embodiment is a curved surface that coincides with the reference surface 21 corresponding to the outer surface 20a of the sidewall portion 20.

In the above aspect, the phrase "to coincide" is not limited to perfect coincidence, and may indicate coincidence in a range including an error unavoidable in manufacturing.

The reference surface 21 is a virtual curved surface which represents an outer surface of the sidewall portion 20 in a configuration not including the mark 50, and smoothly connects the outer surface 20a of the sidewall portion 20.

According to the foregoing configuration, the mark 50 is constituted by the protruded portion 51 protruded from the outer surface 20a of the sidewall portion 20, and the mark body 52 defined by the protruded portion 51. Accordingly, local bending of the carcass layer 40 can be more reduced compared with the configuration in which the mark body 52 is constituted by a protruded portion.

The angle θ formed by each of the first surfaces 51a of the protrusions 51A and 51B and the normal direction N of the reference surface 21 in the cross section orthogonal to the directions in which the protrusions 51A and 51B extend is specified within the appropriate range described above (from 5° inclusive to 30° inclusive). Accordingly, visibility of the mark 50 can be secured. When the angle θ formed by each of the first surfaces 51a of the protrusions 51A and 51B and the normal direction N of the reference surface 21 is larger than the above range, the boundary between the mark body 52 and the protrusions 51A and 51B becomes unclear. In this case, sufficient visibility of the mark 50 cannot be secured. When the angle θ formed by the first surface 51a of each of the protrusions 51A and 51B and the normal direction N of the reference surface 21 is smaller than the above range, the area of the first surface 51a visible from the outside in the normal direction N decreases. In this case, sufficient visibility of the mark 50 cannot be secured.

Moreover, the representative length L of each of the protrusions 51A and 51B in the direction orthogonal to the normal direction N is specified in the appropriate range described above (2.5 times inclusive to 5 times inclusive maximum dimension W of protrusion 51A in normal direction N). In this case, local bending of the carcass layer 40 can be reduced while securing visibility of the mark 50. When the representative length L of each of the protrusions 51A and 51B in the direction orthogonal to the normal direction N is larger than the above range, the dimension of each of the protrusions 51A and 51B in the direction orthogonal to the normal direction N becomes excessively larger. In this case, areas of the protrusions 51A and 51B affecting the shape of the carcass layer 40 increase. When the representative length L of each of the protrusions 51A and 51B in the direction orthogonal to the normal direction N is smaller than the above range, visible areas of the protrusions 51A and 51B decrease. In this case, sufficient visibility cannot be secured.

While the protrusions 51A and 51B appearing in the tire meridian cross section have been described in the present embodiment, but the embodiment is not limited thereto, and other parts of the protruded portion 51 may have a configuration similar to the protrusions 51A and 51B in a cross section orthogonal to the direction in which the protruded portion 51 extends. For example, the protruded portion 51 has a configuration similar to the protrusions 51A and 51B in a cross section along a line C in FIG. 2.

[Pneumatic Tire Molding Die]

Figure 4:
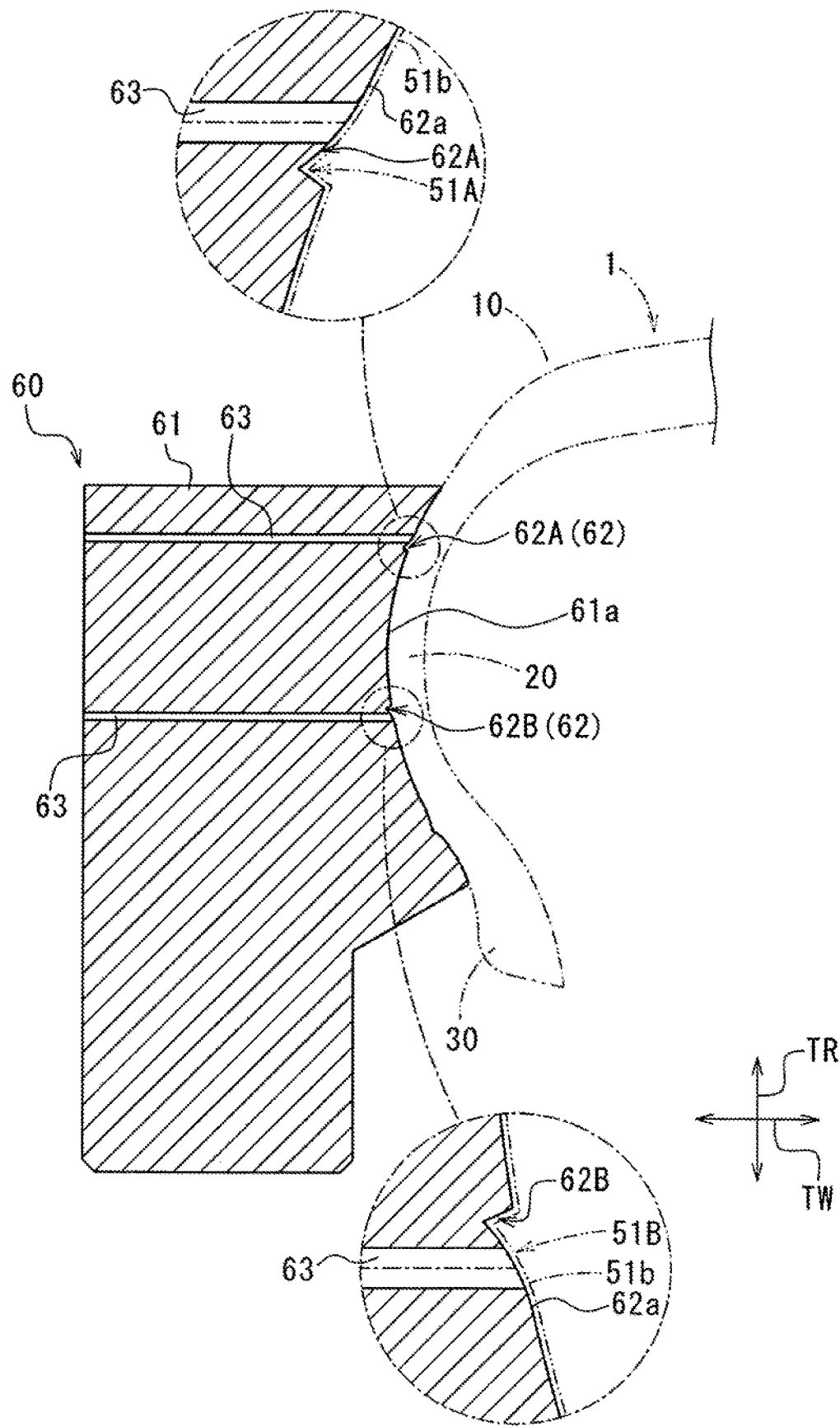
FIG. 4 is a cross-sectional view of a pneumatic tire molding die in the meridian direction according to the first embodiment of the present invention.

Referring to FIG. 4, a pneumatic tire molding die (hereinafter referred to as die) 60 for molding the pneumatic tire 1 of the present embodiment is what is called a segmented mold. The die 60 includes a sector (not shown) used for vulcanization molding of the tread portion 10, a side plate 61 used for vulcanization molding of the sidewall portion 20, a bead ring (not shown) used for vulcanization molding of the bead portions 30.

The side plate 61 includes a molding surface 61a in contact with the sidewall portion 20. The side plate 61 has a recessed portion 62 which has a shape corresponding to the protruded portion 51 and is formed in the molding surface 61a. For example, in the cross section shown in FIG. 4, the recessed portion 62 includes recesses 62A and 62B formed at two different positions of the side plate 61 in the tire radial direction TR. The recesses 62A and 62B have shapes corresponding to the protrusions 51A and 51B, respectively, and are provided at positions corresponding to the protrusions 51A and 51B. Vent holes 63 are formed in portions 62a of the recesses 62A and 62B corresponding to the second surfaces 51b of the protrusions 51A and 51B. Each of the vent holes 63 is so formed as to communicatively connect the inside and the outside of the die 60 to prevent a stay of air within the die 60 during vulcanization molding of the pneumatic tire 1.

According to this configuration, the vent holes 63 are provided in the recesses 62A and 62B where air easily stays during vulcanization molding. Accordingly, reduction of molding failure of the pneumatic tire 1 is achievable.

Moreover, the vent holes 63 are provided in the recesses 62A and 62B corresponding to the second surfaces 51b of the protrusions 51A and 51B. Accordingly, effective reduction of molding failure of the pneumatic tire 1 is achievable.

In the present embodiment, the surface 52a of the mark body 52 of the mark 50 coincides with the reference surface 21 of the sidewall portion 20. In this case, a necessity of processing a portion corresponding to the surface 52a of the mark body 52 is eliminated during processing of the die 60. Accordingly, the number of processing steps for the die 60 can be reduced.

In second and third embodiments described below, elements identical or similar to the corresponding elements of the first embodiment are given identical reference numbers, and detailed description of these elements are not repeated. In addition, advantageous effects similar to those of the first embodiment are produced in the following respective embodiments unless particularly noted otherwise.

Second Embodiment

Figure 5:
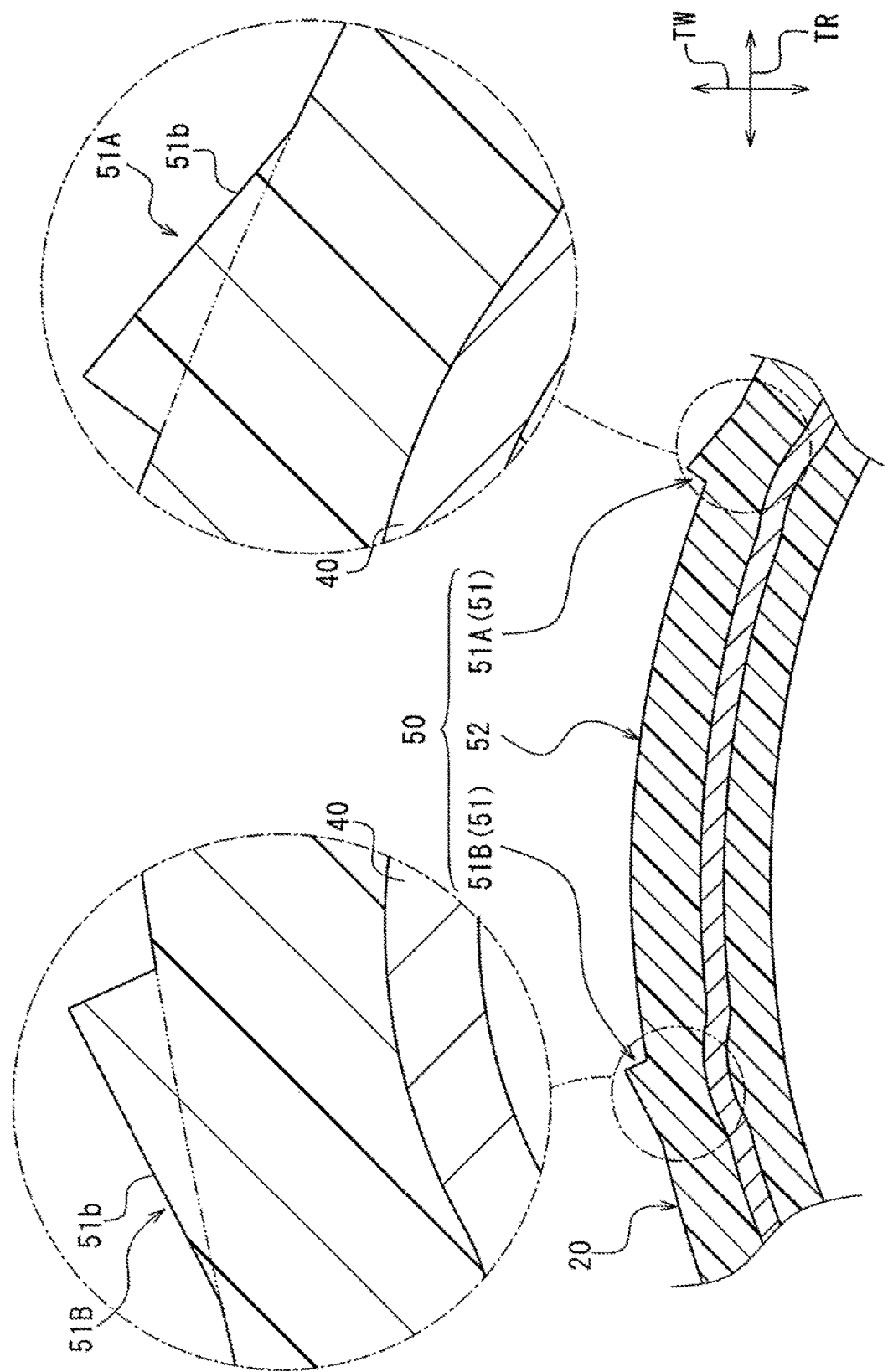
FIG. 5 is a cross-sectional view of a sidewall portion according to a second embodiment of the present invention, as a view corresponding to FIG. 3.

Referring to FIG. 5, the second surface 51b of each of the protrusions 51A and 51B of the present embodiment is linear in the tire meridian cross section.

Third Embodiment

Figure 6:
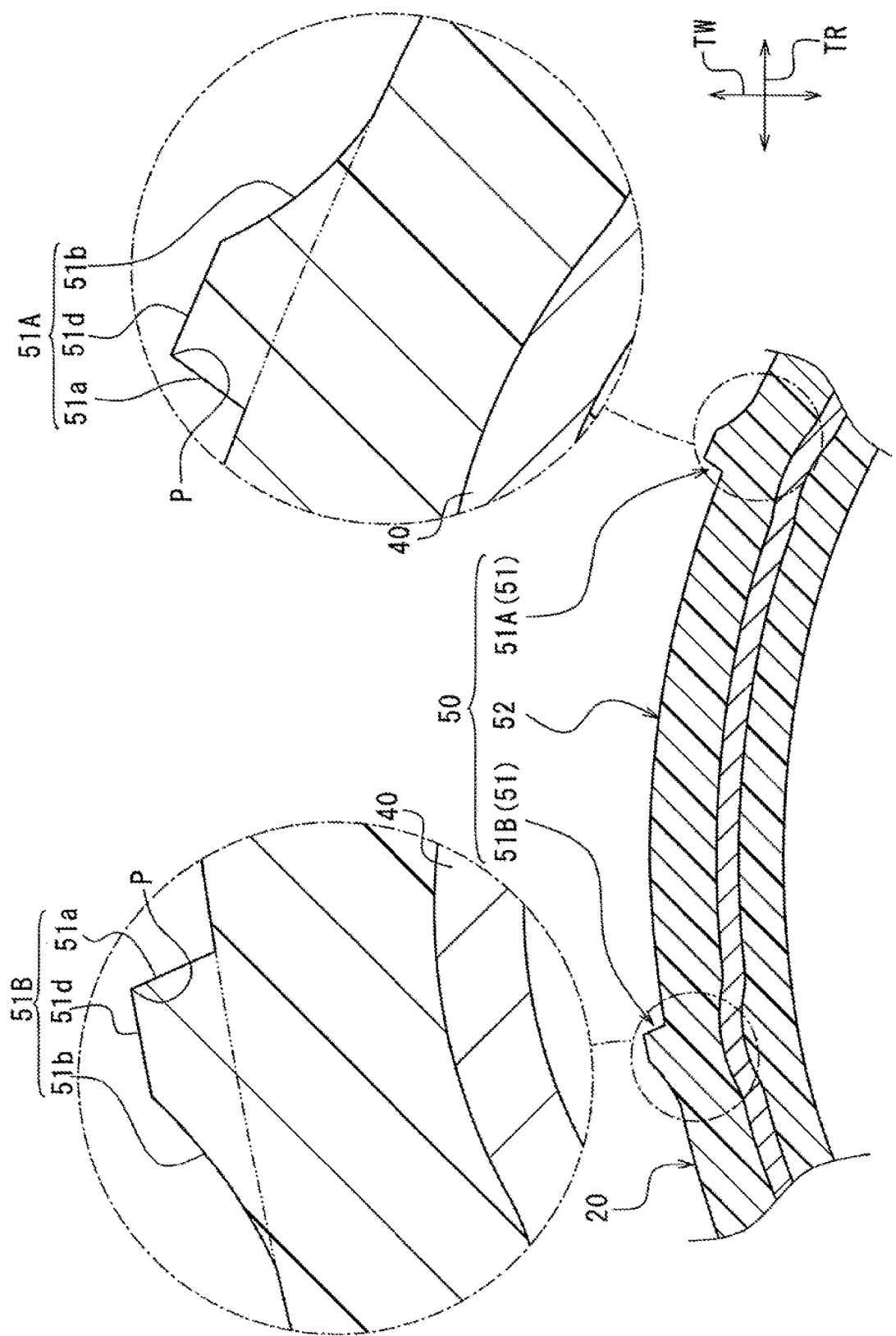
FIG. 6 is a cross-sectional view of a sidewall portion according to a third embodiment of the present invention, as a view corresponding to FIG. 3.

Referring to FIG. 6, each of the protrusions 51A and 51B of the present embodiment includes a third surface 51d that connects the first surface 51a and the second surface 51b. The third surface 51d is linear in the tire meridian cross section. The vertex P of the present embodiment is a boundary point between the first surface 51a and the third surface 51d of each of the protrusions 51A and 51B.

Although the specific embodiments of the present invention have been described, the present invention is not limited to the above embodiments. Various modifications may be made without departing from the scope of the present invention.

For example, the sidewall portion 20 may include serrations.

The mark 50 may be constituted by any mark selected from a letter, a figure, and a symbol, or a combination of these. For example, the character represented by the mark 50 is not limited to the alphabetic capital letter "T" as shown in the above embodiment.

The pneumatic tire molding die 60 is not limited to a segmented mold, but may be what is called a two-piece mold.

What is claimed is:

1. A pneumatic tire comprising:
   a carcass layer that has a toroidal shape and extends between a pair of bead portions;
   a sidewall portion, one of the pair of bead portions being provided at an inner end of the sidewall portion in a tire radial direction; and
   a mark formed in an outer surface of the sidewall portion, wherein
   the mark includes:
   a protruded portion provided in the outer surface of the sidewall portion and protruded outward in a tire width direction and forms an entire edge of the mark; and
   a mark body enclosed by the protruded portion, a surface of the mark body coincides with a reference surface corresponding to the outer surface of the sidewall portion, the protruded portion includes:

a first surface continuous with the surface of the mark body; and a second surface continuously increasing from a connecting portion where the protruded portion is connected to the sidewall portion to a vertex of the protruded portion, in a normal direction of the reference surface, a representative length of the protruded portion in a direction orthogonal to the normal direction of the reference surface in a cross section orthogonal to a direction in which the protruded portion extends lies in a range from 2.5 times inclusive to 5 times inclusive a maximum dimension of the protruded portion in the normal direction of the reference surface along the entire edge of the mark, and the representative length of the protruded portion is a dimension in the direction orthogonal to the normal direction of the reference surface between the vertex of the protruded portion and the connecting portion where the protruded portion is connected to the sidewall portion, and the vertex is at the maximum dimension of the protruded portion in the normal direction of the reference surface.

2. The pneumatic tire according to claim 1, wherein the protruded portion includes a third surface that connects the first surface and the second surface.

3. The pneumatic tire according to claim 2, wherein the first surface is linear in a cross section orthogonal to a direction in which the protruded portion extends, and an angle formed by the first surface and a normal direction of the reference surface in the cross section orthogonal to the direction in which the protruded portion extends lies in a range from 5° inclusive to 30° inclusive.

4. A pneumatic tire molding die for molding the pneumatic tire according to claim 2, wherein a recessed portion is formed in a molding surface of the molding die, the recessed portion being configured to form a mark formed in an outer surface of a sidewall portion of a pneumatic tire, wherein the mark includes;

a protruded portion provided in the outer surface of the sidewall portion and protruded outward in a tire width direction and forms an entire edge of the mark; and a mark body enclosed by the protruded portion, a surface of the mark body coincides with a reference surface corresponding to the outer surface of the sidewall portion, the protruded portion includes;

a first surface continuous with the surface of the mark body; and a second surface continuously increasing from a connecting portion where the protruded portion is connected to the sidewall portion to a vertex of the protruded portion, in a normal direction of the reference surface, a representative length of the protruded portion in a direction orthogonal to the normal direction of the reference surface in a cross section orthogonal to a direction in which the protruded portion extends lies in a range from 2.5 times inclusive to 5 times inclusive a maximum dimension of the protruded portion in the normal direction of the reference surface along the entire edge of the mark, and the representative length of the protruded portion is a dimension in the direction orthogonal to the normal direction of the reference surface between the vertex of the protruded portion and the connecting portion where the protruded portion is connected to the sidewall portion, the vertex is at the maximum dimension of the protruded portion in the normal direction of the reference surface, the protruded portion includes a third surface that connects the first surface and the second surface, and a vent hole is formed in the recessed portion.

5. The pneumatic tire molding die according to claim 4, wherein the vent hole is formed in a portion of the recessed portion, the portion corresponding to the second surface of the protruded portion.

6. The pneumatic tire according to claim 1, wherein the first surface is linear in a cross section orthogonal to a direction in which the protruded portion extends, and an angle formed by the first surface and a normal direction of the reference surface in the cross section orthogonal to the direction in which the protruded portion extends lies in a range from 5° inclusive to 30° inclusive.

7. A pneumatic tire molding die for molding the pneumatic tire according to claim 6, wherein:

a recessed portion is formed in a molding surface of the molding die, the recessed portion being configured to form a mark formed in an outer surface of a sidewall portion of a pneumatic tire, wherein the mark includes:

a protruded portion provided in the outer surface of the sidewall portion and protruded outward in a tire width direction and forms an entire edge of the mark; and a mark body enclosed by the protruded portion, a surface of the mark body coincides with a reference surface corresponding to the outer surface of the sidewall portion, the protruded portion includes:

a first surface continuous with the surface of the mark body; and a second surface continuously increasing from a connecting portion where the protruded portion is connected to the sidewall portion to a vertex of the protruded portion, in a normal direction of the reference surface, a representative length of the protruded portion in a direction orthogonal to the normal direction of the reference surface in a cross section orthogonal to a direction in which the protruded portion extends lies in a range from 2.5 times inclusive to 5 times inclusive a maximum dimension of the protruded portion in the normal direction of the reference surface along the entire edge of the mark, and the representative length of the protruded portion is a dimension in the direction orthogonal to the normal direction of the reference surface between the vertex of the protruded portion and the connecting portion where the protruded portion is connected to the sidewall portion, the vertex is at the maximum dimension of the protruded portion in the normal direction of the reference surface, the first surface is linear in a cross section orthogonal to a direction in which the protruded portion extends, and an angle formed by the first surface and a normal direction of the reference surface in the cross section orthogonal to the direction in which the protruded portion extends lies in a range from 5° inclusive to 30° inclusive, and a vent hole is formed in the recessed portion.

8. The pneumatic tire molding die according to claim 7, wherein the vent hole is formed in a portion of the recessed portion, the portion corresponding to the second surface of the protruded portion.

9. A pneumatic tire molding die for molding the pneumatic tire according to claim 1, wherein
a recessed portion is formed in a molding surface of the molding die,
the recessed portion being configured to form a mark formed in an outer surface of a sidewall portion of a pneumatic tire,
wherein the mark includes:
a protruded portion provided in the outer surface of the sidewall portion and protruded outward in a tire width direction and forms an entire edge of the mark; and
a mark body enclosed by the protruded portion,
a surface of the mark body coincides with a reference surface corresponding to the outer surface of the sidewall portion,
the protruded portion includes:
a first surface continuous with the surface of the mark body; and a second surface continuously increasing from a connecting portion where the protruded portion is connected to the sidewall portion to a vertex of the protruded portion, in a normal direction of the reference surface,
a representative length of the protruded portion in a direction orthogonal to the normal direction of the reference surface in a cross section orthogonal to a direction in which the protruded portion extends lies in a range from 2.5 times inclusive to 5 times inclusive a maximum dimension of the protruded portion in the normal direction of the reference surface along the entire edge of the mark, and
the representative length of the protruded portion is a dimension in the direction orthogonal to the normal direction of the reference surface between the vertex of the protruded portion and the connecting portion where the protruded portion is connected to the sidewall portion,
the vertex is at the maximum dimension of the protruded portion in the normal direction of the reference surface, and
a vent hole is formed in the recessed portion.

10. The pneumatic tire molding die according to claim 9, wherein the vent hole is formed in a portion of the recessed portion, the portion corresponding to the second surface of the protruded portion.

* * * * *